Oct. 6, 1925.　　　　　　　　　　　　　　　　1,556,427
W. R. COUGHTRY
CLUTCH CONSTRUCTION HAVING TOOTHED FIBER DISKS
Filed Sept. 24, 1924
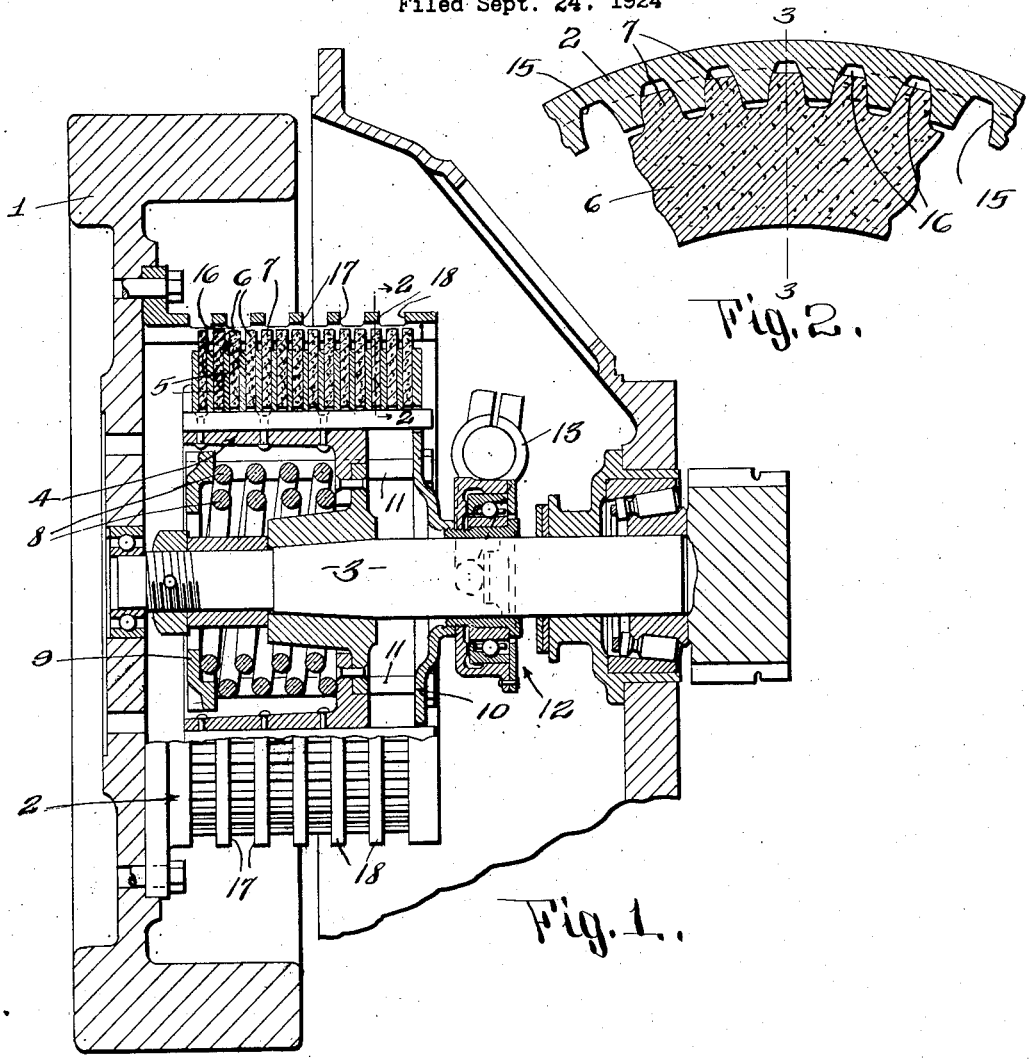
Fig. 2.
Fig. 1.
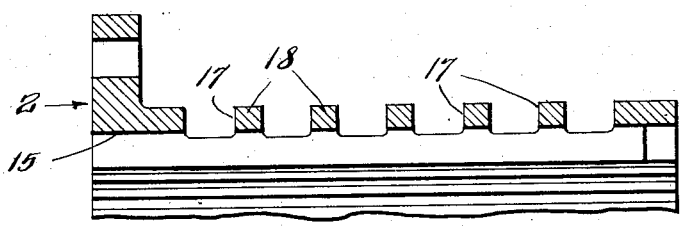
Fig. 3.
INVENTOR.
William Reed Coughtry
by
Parsons Rodell
ATTORNEYS.

Patented Oct. 6, 1925.

1,556,427

UNITED STATES PATENT OFFICE.

WILLIAM REED COUGHTRY, OF SYRACUSE, NEW YORK, ASSIGNOR TO THE BROWN-LIPE GEAR COMPANY, OF SYRACUSE, NEW YORK, A CORPORATION OF NEW YORK.

CLUTCH CONSTRUCTION HAVING TOOTHED FIBER DISKS.

Application filed September 24, 1924. Serial No. 739,508.

*To all whom it may concern:*

Be it known that I, WILLIAM REED COUGHTRY, a citizen of the United States, and a resident of Syracuse, in the county of Onondaga, in the State of New York, have invented a certain new and useful Clutch Construction Having Toothed Fiber Disks, of which the following is a specification.

This invention relates to multiple disk clutches and particularly to clutches in which one set of disks is provided with fiber teeth for slidably interlocking with complemental teeth or grooves formed in the driven or driving element of the clutch with which said disks rotate, and has for its object a particularly simple, strong and efficient construction by which a clearance is provided for the material worn from the fiber teeth and also outlet from such clearance for such material.

The invention consists in the novel features and in the combinations and constructions hereinafter set forth and claimed and described.

In describing this invention, reference is had to the accompanying drawings in which like characters designate corresponding parts in all the views.

Figure 1 is a vertical sectional view, partly in elevation, of a clutch embodying my invention.

Figure 2 is an enlarged detail sectional view taken approximately on line 2—2, Fig. 1.

Figure 3 is an enlarged sectional view approximately on line 3—3, Fig. 2, the disk shown in Fig. 2, being omitted.

In multiple disk clutches having one set of disks formed with fiber teeth, that is, one set of disks being of fibrous material and formed with fiber teeth instead of being composed of steel disks formed with teeth and having fiber disks riveted thereto, the material of the fiber teeth wears and clogs into spaces or grooves in which the teeth are interlocked and interferes with the sliding or releasing action of the clutch and this invention has primarily for its object a construction by which such interference is eliminated.

This invention comprises, generally, a clutch embodying driving and driven elements and sets of interleaved disks interlocked respectively with said elements, one or each of said elements comprising a drum formed with lengthwise grooves therein and one set of disks being of fibrous material or having fibrous teeth or projections slidably interlocked in the grooves, the grooves and the projections being formed to provide a clearance at the bottoms of the grooves and the tops of the projections for material worn from the fiber teeth.

1 designates the driving element, which is usually the fly-wheel of an internal combustion engine for motor vehicles in which the clutch is installed. The fly-wheel has a drum 2 on the rear side thereof.

The driven element comprises a shaft 3 having a member or drum 4 thereon, within the drum 2.

5 and 6 are respectively sets of interleaved disks, slidably interlocked respectively with the inner drum 4 and the outer drum 2, the disks 5 being usually steel, and the disks 6 of fibrous frictional material and formed with peripheral projections or fibrous teeth 7. The disks are pressed into engaging position in any suitable manner, as by a main spring 8, interposed between the rear head of the inner drum 4 and a spring abutment 9, the latter being connected to a pressure plate 10 by pull rods or bolts 11. The disks are released to disengage the clutch by any suitable means, that here shown being a throw-out collar 12, connected to the pressure plate 10 and coacting with a throw-out yoke 13, which is actuated by a lever or clutch pedal, not shown, in the usual manner.

Although one set of disks is formed with fibrous teeth, both sets may be formed therewith, but preferably the set interlocked with the outer drum 2 only, is provided with fibrous teeth. The construction of the disks or the use of fibrous disks with fibrous teeth, per se, forms no part of this invention.

This invention has for its object a construction, whereby means is provided for permitting the matter worn off from the fibrous teeth from interfering with the free sliding action of the disks, or the formation of a clearance or outlet for the worn matter, without materially weakening the interlocking teeth.

As here illustrated, the outer drum 2, that is, the drum with which the fiber disks are interlocked, is formed with lengthwise internal grooves in the form of spaces between gear teeth, and in fact the outer drum is in effect formed with internal gear teeth, the spaces between which are cut full depth, that is, with a full depth cutter, and the teeth of the fibrous disks are also in the form of gear teeth, but the spaces 15 being cut full depth, a clearance is provided at 16 at the ends of the teeth of the disks for receiving the matter worn from the disks. Also preferably the teeth 7 of the fiber disks 6 are stub teeth, thereby together with the full depth spaces forming clearances for the matter worn from the fiber teeth. Owing to the fact that the spaces are full depth and the teeth of the disks stub teeth, ample stock is left at the bases of the internal teeth of the drum 2 to provide strength to the teeth, or without undue weakening the teeth by the formation of the clearance. Preferably the spaces between the teeth of the drum are formed with outlets for the matter that accumulates in the clearance spaces 16, and, as here shown, the drum 2 is formed with annular peripheral spaced apart grooves 17, which open through the bottoms of the full depth spaces, the portions 18 left between the grooves 17 constituting braces or supports for the internal teeth of the drum 2. As the spaces between the teeth of the drum 2 are full depth, ample stock is provided without weakening the teeth at their roots. These annular grooves in effect make the drum in skeleton or cage form, the teeth constituting lengthwise bars and the annular ribs 18 supporting or reinforcing means for the bars.

In operation the matter worn from the teeth 7 of the fiber disks accumulate in the clearance spaces, and these clearance spaces are large enough to contain all the matter that would be worn off from the fiber teeth during the life of the disks. However, owing to the skeleton formation of the drum this matter can work out through the perforations as it accumulates.

What I claim is:

1. In a multiple disk clutch, the combination of driving and driven elements and sets of interleaved disks interlocked respectively with said elements, one of the elements comprising a drum formed with lengthwise grooves therein, one set of disks being of fibrous material and having fiber projections slidably interlocked in the grooves, the grooves and projections being formed to provide a clearance at the bottoms of the grooves and the tops of the projections.

2. In a multiple disk clutch, the combination of driving and driven elements and sets of interleaved disks interlocked respectively with said elements, one of said elements comprising a drum formed with lengthwise grooves therein, one set of disks being of fibrous material and having fiber projections slidably interlocked in the grooves, the grooves and the projections being in the form of gear teeth and being formed to provide a clearance at the bottoms of the grooves in one of said elements and the tops of the teeth.

3. In a multiple disk clutch, the combination of driving and driven elements and sets of interleaved disks interlocked respectively with said elements, one of said elements comprising a drum formed with lengthwise grooves therein, one set of disks being of fibrous material and having fiber projections slidably interlocked in the grooves, the grooves being in the form of full depth spaces between gear teeth and the projections being in the form of stub gear teeth, thereby providing a clearance between the ends of the stub gear teeth and the bottoms of the spaces, for receiving material worn from the fiber teeth.

4. In a multiple disk clutch, the combination of driving and driven elements and sets of interleaved disks interlocked respectively with said elements, one of said elements comprising a drum formed with lengthwise grooves therein, one set of disks being of fibrous material and having fiber projections slidably interlocked in the grooves, the projections being in the form of gear teeth and the grooves being in the form of spaces between gear teeth and being of full depth thereby providing a clearance between the ends of the teeth of the disks and the bottoms of the spaces for material worn from the fiber teeth and the element formed with the spaces being also formed with perforations opening through the bottoms of the full depth spaces.

5. In a multiple disk clutch, the combination of driving and driven elements and sets of interleaved disks interlocked respectively with said elements, one of the elements comprising a drum formed with lengthwise grooves, one set of disks being of fibrous material and having fiber projections interlocked in the grooves, the grooves being in the form of spaces between gear teeth and the projections being in the form of gear teeth, the grooves being full depth thereby providing a clearance for the material worn from the fiber teeth, between the ends of the teeth and the bottoms of the full depth spaces or grooves, and the drum having a cylindrical wall of reduced thickness at spaced apart intervals and such reduced portions opening through the bottoms of the full depth spaces thereby providing an outlet for the worn material in the clearance spaces.

6. In a multiple disk clutch, the combination of driving and driven elements and sets of interleaved disks interlocking respectively with said elements, one of the elements comprising a drum formed with lengthwise grooves, one set of disks being of fibrous material and having fiber projections interlocked in the grooves, the grooves being in the form of spaces between gear teeth and being full depth and the projections being in the form of stub gear teeth, thereby providing a clearance for the material worn from the fiber teeth, and the drum having a cylindrical wall of reduced thickness at spaced apart intervals and such reduced portions opening through the bottoms of the full depth spaces thereby providing an outlet for the worn material in the clearance space.

7. In a multiple disk clutch, the combination of a driving and driven elements and sets of interleaved disks interlocked respectively with said elements, one of said elements comprising a drum formed with internal lengthwise grooves therein and one set of disks being of fibrous material and having external fiber projections slidably interlocked in the grooves, the grooves being in the form of full depth spaces between gear teeth, and the projections of the disk being in the form of stub gear teeth thereby providing a clearance space between the ends of the gear teeth and the bottoms of the spaces for the fiber worn from the teeth and the drum being formed with spaced apart annular peripheral grooves opening through the bottoms of said spaces thereby providing outlets for the worn material in the grooves.

8. In a multiple disk clutch, the combination of driving and driven elements and sets of interleaved disks interlocked respectively with said elements, one of said elements being in the form of a skeleton drum comprising parallel spaced apart bars and spaced apart means supporting the bars between their ends and one set of disks having projections slidably interlocked with the bars and projecting into the spaces between the bars.

In testimony whereof, I have hereunto signed my name, at Syracuse, in the county of Onondaga, and State of New York, this 22nd day of Sept., 1924.

WILLIAM REED COUGHTRY.